US012798804B2

(12) United States Patent
Chen et al.

(10) Patent No.: US 12,798,804 B2
(45) Date of Patent: Nov. 17, 2026

(54) UNMANNED AERIAL VEHICLE AND LANDING METHOD FOR UNMANNED AERIAL VEHICLE

(71) Applicant: Coretronic Intelligent Robotics Corporation, Hsin-Chu (TW)

(72) Inventors: Ssu-Ming Chen, Hsin-Chu (TW); Ta-Ho Huang, Hsin-Chu (TW); Chen-Yi Lee, Hsin-Chu (TW)

(73) Assignee: Coretronic Intelligent Robotics Corporation, Hsin-Chu (TW)

( * ) Notice: Subject to any disclaimer, the term of this patent is extended or adjusted under 35 U.S.C. 154(b) by 214 days.

(21) Appl. No.: 17/994,404

(22) Filed: Nov. 28, 2022

(65) Prior Publication Data

US 2023/0174255 A1 Jun. 8, 2023

(30) Foreign Application Priority Data

Dec. 2, 2021 (CN) ........................ 202111456525.2

(51) Int. Cl.
*B64U 70/40* (2023.01)
*B64C 39/02* (2023.01)
(Continued)

(52) U.S. Cl.
CPC ............ *B64U 70/40* (2023.01); *B64C 39/024* (2013.01); *B64D 45/04* (2013.01); *G05D 1/042* (2013.01); *B64U 2201/10* (2023.01)

(58) Field of Classification Search
CPC .. B64U 70/40; B64U 2201/10; B64C 39/024; B64D 45/04; G05D 1/042; G05D 1/102; G05D 1/0676
See application file for complete search history.

(56) References Cited

U.S. PATENT DOCUMENTS

2004/0193334 A1* 9/2004 Carlsson .............. G05D 1/0022 701/9
2020/0285253 A1* 9/2020 Iwakura ................. B64U 10/16
(Continued)

FOREIGN PATENT DOCUMENTS

CN 112306084 2/2021
CN 113625759 11/2021
(Continued)

OTHER PUBLICATIONS

"Office Action of China Counterpart Application", issued on Apr. 18, 2025, p. 1-p. 5.
(Continued)

*Primary Examiner* — Faris S Almatrahi
*Assistant Examiner* — Dana F Artimez
(74) *Attorney, Agent, or Firm* — JCIPRNET

(57) ABSTRACT

An unmanned aerial vehicle and a landing method for unmanned aerial vehicle are provided. The unmanned aerial vehicle includes a positioning device and a processor. When the processor detects a fight status of the unmanned aerial vehicle, the processor obtains a current coordinate from the positioning device. According to the current coordinate, a predetermined route, and a plurality of emergency landing coordinates, the processor calculates a plurality of distances for the unmanned aerial vehicle moving from the current coordinate to each of the emergency landing coordinates along the predetermined route. According to a shortest distance among the plurality of distances, the processor obtains a target emergency landing coordinate. The processor controls the unmanned aerial vehicle to move to the target emergency landing coordinate along the predetermined route.

7 Claims, 2 Drawing Sheets

(51) Int. Cl.

| | |
|---|---|
| ***B64D 45/04*** | (2006.01) |
| ***G05D 1/00*** | (2024.01) |

(56) References Cited

U.S. PATENT DOCUMENTS

| | | | | |
|---|---|---|---|---|
| 2021/0141373 | A1* | 5/2021 | Bash | G05D 1/0027 |
| 2021/0225178 | A1* | 7/2021 | Kusumi | G08G 5/58 |
| 2021/0287558 | A1* | 9/2021 | Schulze | B64D 1/08 |
| 2022/0024582 | A1* | 1/2022 | Nakazawa | G08G 5/34 |

FOREIGN PATENT DOCUMENTS

| | | |
|---|---|---|
| CN | 113655812 | 11/2021 |
| JP | 6665318 | 3/2020 |
| KR | 20160112080 | 9/2016 |
| WO | 2013124852 | 8/2013 |
| WO | 2018110088 | 6/2018 |
| WO | 2020095430 | 5/2020 |
| WO | 2020107248 | 6/2020 |
| WO | 2021033256 | 2/2021 |

OTHER PUBLICATIONS

"Office Action of Japan Counterpart Application", issued on Apr. 28, 2026, p. 1-p. 2.

* cited by examiner

UNMANNED AERIAL VEHICLE AND LANDING METHOD FOR UNMANNED AERIAL VEHICLE

CROSS-REFERENCE TO RELATED APPLICATION

This application claims the priority benefit of China application serial no. 202111456525.2 filed on Dec. 2, 2021. The entirety of the above-mentioned patent application is hereby incorporated by reference herein and made a part of this specification.

BACKGROUND

Technical Field

The invention relates to a landing method for an unmanned aerial vehicle, and in particular, to an unmanned aerial vehicle and a landing method for an unmanned aerial vehicle applied to emergency landing.

Description of Related Art

In recent years, when an emergency (e.g. emergencies caused by power issue or other external causes) occurs during a flight of an unmanned aerial vehicle, the unmanned aerial vehicle is unable to continue the flight according to a predetermined route and automatically flies to an emergency landing zone (ELZ).

In a conventional landing method for the unmanned aerial vehicle, when an emergency occurs on the unmanned aerial vehicle, the unmanned aerial vehicle may stop a predetermined flying task and directly fly to the emergency landing zone at the shortest linear distance for landing. However, if there is an obstacle or a no-flight zone along the linear path between the unmanned aerial vehicle and the emergency landing zone, it may result in damage to the unmanned aerial vehicle and pose a danger to people.

Accordingly, an unmanned aerial vehicle and a landing method for an unmanned aerial vehicle allowing the unmanned aerial vehicle to safely make a landing to the emergency landing zone in the emergency and the related technology are a key issue in the field of the research and development of the unmanned aerial vehicle system.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides an unmanned aerial vehicle and a landing method for an unmanned aerial vehicle capable of flying to an emergency landing area at a shortest flying distance along a predetermined route, so as to prevent the unmanned aerial vehicle from colliding with an obstacle or flying into a no-flight zone when making an emergency landing.

Other objectives, features and advantages of the present invention will be further understood from the further technological features disclosed by the embodiments of the present invention wherein there are shown and described preferred embodiments of this invention, simply by way of illustration of modes best suited to carry out the invention.

To achieve one of, some of, or all of the objectives above or other objectives, an embodiment of the invention provides a landing method for an unmanned aerial vehicle. The landing method for the unmanned aerial vehicle includes the following. A processor detects a flight status of the unmanned aerial vehicle and obtains a current coordinate of the unmanned aerial vehicle from a positioning device. The processor calculates multiple distances for the unmanned aerial vehicle to move from the current coordinate to multiple emergency landing coordinates along a predetermined route according to the current coordinate, the predetermined route, and the multiple emergency landing coordinates. The processor obtains a target emergency landing coordinate according to the shortest distance among the distances. The target emergency landing coordinate is the emergency landing coordinate corresponding to the shortest distance. The processor controls the unmanned aerial vehicle to move to the target emergency landing coordinate along the predetermined route.

In an embodiment of the invention, multiple passing points are marked on the predetermined route, and the multiple passing points include multiple emergency passing points respectively corresponding to the emergency landing coordinates.

In an embodiment of the invention, each of the distances is a sum of a flying distance of the unmanned aerial vehicle from the current coordinate to a corresponding emergency passing point along the predetermined route and a flight landing distance. The flight landing distance is a distance between each of the emergency landing coordinates and the corresponding emergency passing point.

In an embodiment of the invention, the passing points include an end point and an origin of the predetermined route.

In an embodiment of the invention, the emergency landing coordinates further include an end point coordinate and an origin coordinate of the predetermined route. When the target emergency landing coordinate is the end point coordinate, the corresponding emergency passing point is the end point. When the target emergency landing coordinate is the origin coordinate, the corresponding emergency passing point is the origin.

An unmanned aerial vehicle of the invention includes a positioning device and a processor. The positioning device is configured to generate a current coordinate of the unmanned aerial vehicle. The processor is coupled to the positioning device. When the processor detects a flight status of the unmanned aerial vehicle, the processor obtains the current coordinate from the positioning device. The processor calculates multiple distances for the unmanned aerial vehicle to move from the current coordinate to multiple emergency landing coordinates along a predetermined route according to the current coordinate, the predetermined route, and the multiple emergency landing coordinates. The processor obtains a target emergency landing coordinate according to a shortest distance among the distances. The target emergency landing coordinate is the emergency landing coordinate corresponding to the shortest distance. The processor controls the unmanned aerial vehicle to move to the target emergency landing coordinate along the predetermined route.

Based on the above, the invention may provide the unmanned aerial vehicle with a favorable emergency landing point and allow the unmanned aerial vehicle to fly to the corresponding emergency passing point along the predetermined route before flying to the emergency landing coordinate. Since the path of the emergency passing point to the emergency landing coordinate is a single path, it may be prevented that the unmanned aerial vehicle flies to an unknown path and encounters an obstacle. Hence, the safety of the unmanned aerial vehicle making emergency landing may be improved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The invention provides an unmanned aerial vehicle and a landing method for an unmanned aerial vehicle that may be realized by any electronic device with a calculating function. In order to make the contents of the invention easier to understand, the following embodiments are specifically cited as examples on which the invention may be implemented.

Figure 1:
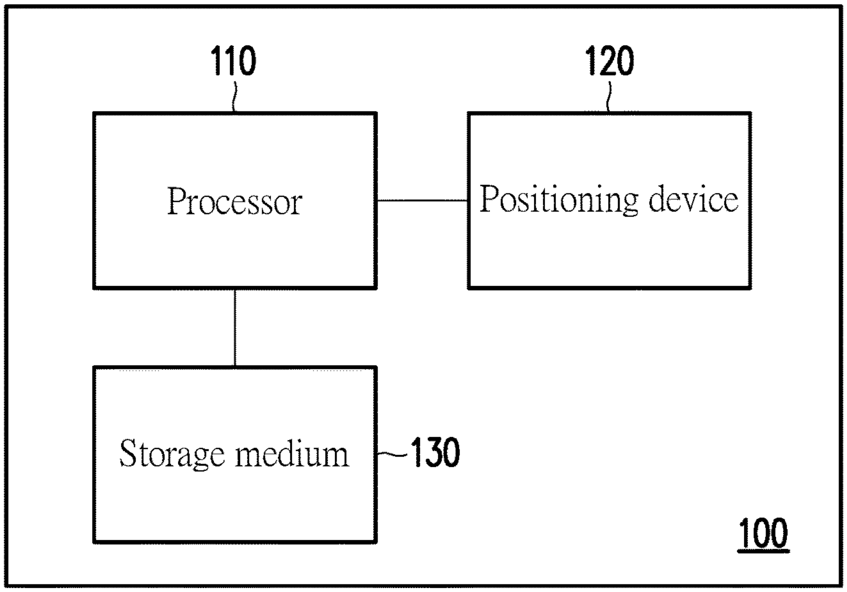
FIG. 1 is a block diagram of an unmanned aerial vehicle according to an embodiment of the invention.
Figure 2:
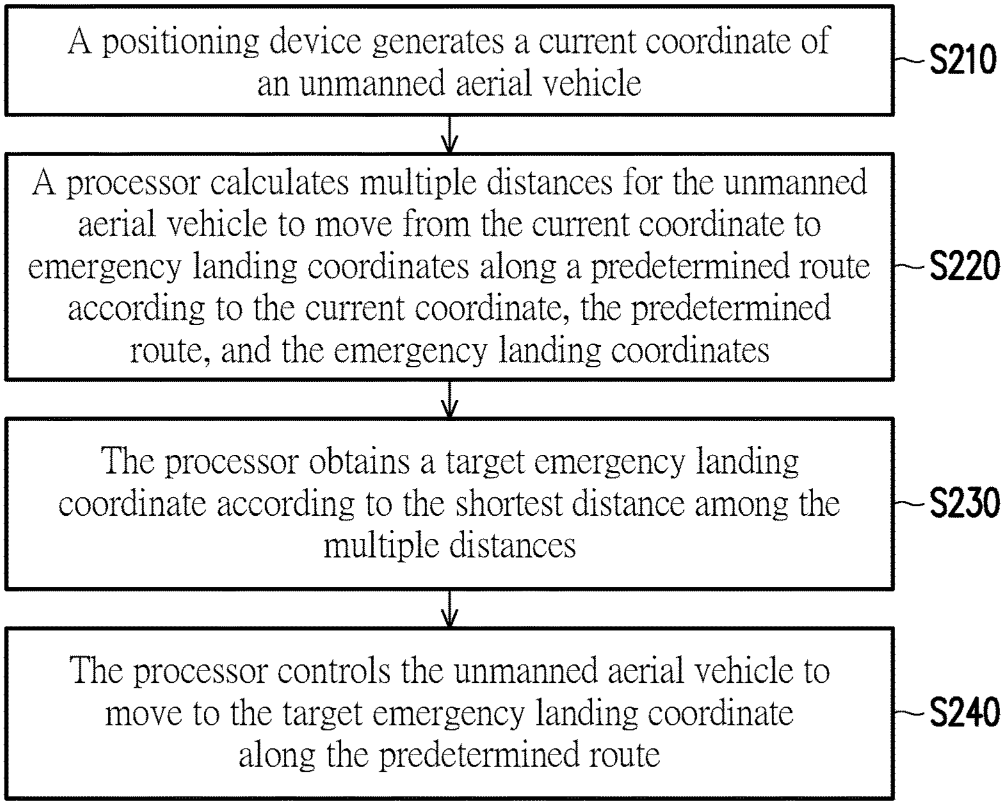
FIG. 2 is a flow chart of a landing method for an unmanned aerial vehicle according to an embodiment of the invention.

FIG. 1 is a block diagram of an unmanned aerial vehicle according to an embodiment of the invention. FIG. 2 is a flow chart of a landing method for an unmanned aerial vehicle according to an embodiment of the invention. Note that the examples of FIG. 1 and FIG. 2 are provided only for ease of description, and the invention is not limited thereto.

Referring to FIG. 1, an unmanned aerial vehicle 100 provided in the embodiment includes a processor 110 and a positioning device 120. The positioning device 120 is configured to generate a current coordinate of the unmanned aerial vehicle 100, and the processor 110 is coupled to the positioning device 120. In another embodiment, the unmanned aerial vehicle 100 further includes a storage medium 130. The storage medium 130 is electrically connected to the processor 110, and the storage medium 130 is configured to store a look-up table and a predetermined route. The look-up table includes multiple emergency landing coordinates and multiple emergency passing points respectively corresponding to the multiple emergency landing coordinates.

The processor 110 is, for example, a central processing unit (CPU), a graphic processing unit (GPU), a physics processing unit (PPU), a programmable microprocessor, an embedded control chip, a digit signal processor (DSP), an application specific integrated circuit (ASIC), or other similar devices.

The positioning device 120 is, for example, a global positioning system (GPS) device, and the positioning device 120 is configured to receive a GPS signal of the GPS to position a position of the current coordinate of the unmanned aerial vehicle 100. In the embodiment, the positioning device 120 may continuously transmit identified positioning information (i.e. the position of the current coordinate of the unmanned aerial vehicle 100) to the processor 110.

The storage medium 130 is, for example, may be any type of fixed or mobile random access memory (RAM), read only memory (ROM), flash memory, hard disk drive (HDD), solid-state drive (SDD), other similar devices, or a combination of the devices above. In an embodiment, the storage medium 130 is configured to store multiple program code segments. After the program code segments are installed, the processor 110 executes the program code segments to execute a control method of a moving path of the unmanned aerial vehicle 100.

In another embodiment, the unmanned aerial vehicle 100 further includes a transceiver (not shown). The transceiver is electrically connected to the processor 110 and is configured to transmit information to a ground station (not shown) and receive the information from the ground station. The information may include, for example, a flying order, the look-up table, and the predetermined route. In an embodiment, when the ground station transmits the flying order to the unmanned aerial vehicle 100, the predetermined route and the look-up table are also transmitted to the unmanned aerial vehicle 100. The predetermined route includes multiple coordinate positions of the passing points and a passing order of the passing points. Hence, the unmanned aerial vehicle 100 may obtain a predetermined flying path according to a coordinate position of each of the passing points and the passing order. The transceiver transmits and receives a signal in a wireless or a wired manner. The transceiver transmits and receives the signal with Bluetooth, Wi-Fi, Zigbee or in other wireless manners. The transceiver includes, for example, hardware devices such as a transmitter and a receiver, and the invention is not limited thereto. In another embodiment, the transceiver may further execute, for example, low noise amplifying (LNA), impedance matching, frequency mixing, up or down frequency conversion, wave filtering, amplification, and similar operations.

Referring to FIG. 1 and FIG. 2 together, in step S210, when the processor 110 detects a flight status of the unmanned aerial vehicle 100, the processor 110 obtains the current coordinate of the unmanned aerial vehicle 100 from the positioning device 120. In the embodiment, the flight status of the unmanned aerial vehicle 100 is specifically an emergency landing status, and the emergency landing status is a status automatically activated due to an occurrence of an emergency on the unmanned aerial vehicle 100. An emergency is, for example, a state in which the unmanned aerial vehicle 100 has insufficient power, poor connection, abnormal operation or the unmanned aerial vehicle 100 is under attack. Specifically, when the processor 110 detects an abnormal flight status of the unmanned aerial vehicle 100, the processor 110 may instantly obtain the current coordinate of the unmanned aerial vehicle 100 from the positioning device 120.

In an embodiment, the positioning device 120 may receive a positioning signal through the positioning device 120 itself. In another embodiment, the positioning device 120 may be electrically connected to the transceiver (not shown) and receive the positioning signal through the transceiver. The positioning device 120 may calculate the position of the current coordinate of the unmanned aerial vehicle 100 according to the received positioning signal. In an embodiment, the positioning device 120 may obtain the current coordinate of the unmanned aerial vehicle 100 by adopting a real time kinematic (RTK) technology. In addition, the positioning device 120 may calculate a distance between the unmanned aerial vehicle 100 and a fixed point (e.g. an origin, an end point, or the ground station) by adopting at least one of a time of arrival (TOA) positioning method, a time difference of arrival (TDOA) positioning method, and a received signal strength indicator (RSSI) method to obtain the current coordinate of the unmanned aerial vehicle 100; however, the invention is not limited thereto. The positioning methods of the unmanned aerial vehicle above are well-known technical means to those skilled in the art, so that details thereof are not repeated.

Next, in step S220, the processor 110 calculates each distance for the unmanned aerial vehicle 100 to move from the current coordinate to each of the emergency landing coordinates along the predetermined route according to the current coordinate, the predetermined route, and the multiple emergency landing coordinates. Specifically, multiple different moving tracks of the unmanned aerial vehicle 100 may be stored in the storage medium 130 in advance as the predetermined routes. Accordingly, the processor 110 may adopt a predetermined route of a current task that the unmanned aerial vehicle 100 desires to accomplish as a current predetermined path, and each position in the predetermined route may be defined as a coordinate value in a planar coordinate system or a spatial coordinate system. In addition, multiple emergency landing coordinates (EL1, EL2, EL3) of each of the predetermined routes may be set in advance in the storage medium 130. For example, when the unmanned aerial vehicle 100 plans a task field, a user or the unmanned aerial vehicle 100 may establish at least one emergency landing zone (ELZ), and the emergency landing zone may be defined as the coordinate value in the planar coordinate system or the spatial coordinate system, that is, the emergency landing coordinate of the invention. When the emergency occurs on the unmanned aerial vehicle 100 or when the unmanned aerial vehicle 100 is in any other uncontrollable state, the unmanned aerial vehicle 100 may automatically fly to the emergency landing coordinate to avoid harm to people or damage to the unmanned aerial vehicle 100.

Figure 3:
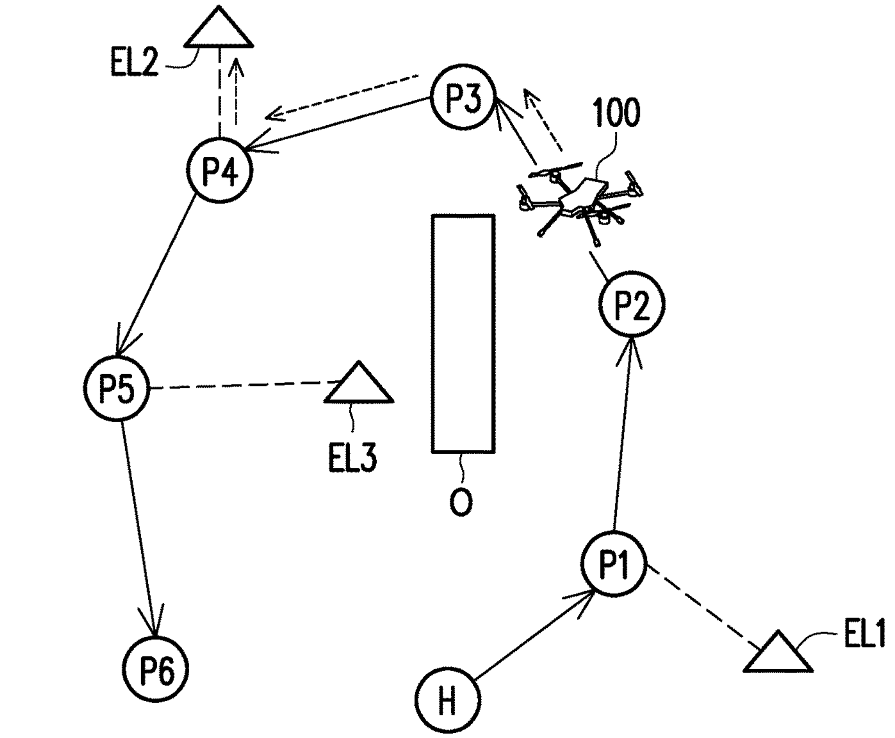
FIG. 3 is a schematic diagram of a predetermined route, emergency landing coordinates, and passing points according to an embodiment of the invention.

Referring to FIG. 3, FIG. 3 is a schematic diagram of a predetermined route, emergency landing coordinates, and passing points according to an embodiment of the invention. Specifically, multiple passing points (P1 to P5) are marked on the predetermined route of the unmanned aerial vehicle 100, and the passing points (P1 to P5) include multiple emergency passing points (P1, P4, and P5) respectively corresponding to the emergency landing coordinates (EL1, EL2, and EL3). In the embodiment, the storage medium 130 is configured to store the look-up table and the predetermined route. The look-up table includes the emergency landing coordinates (EL1, EL2, and EL3) and the emergency passing points (P1, P4, and P5) respectively corresponding to the emergency landing coordinates. For example, the look-up table may be shown as Table 1 below:

TABLE 1

| Emergency landing coordinate | Emergency passing point |
|---|---|
| EL1 | P1 |
| EL2 | P4 |
| EL3 | P5 |

As shown in Table 1, in the embodiment, the corresponding emergency passing point of the emergency landing coordinate EL1 is P1, the corresponding emergency passing point of the emergency landing coordinate EL2 is P4, and the corresponding emergency passing point of the emergency landing coordinate EL3 is P5. The invention is not limited thereto.

Note that the distances for the unmanned aerial vehicle 100 to move from the current coordinate to the emergency landing coordinates (EL1, EL2, and EL3) along the predetermined route are the sums of the flying distances of the unmanned aerial vehicle 100 from the current coordinate to the corresponding emergency passing points (P1, P4, and P5) along the predetermined route and a flight landing distance. In an embodiment, the flight landing distance is a distance between each of the emergency landing coordinates (EL1, EL2, and EL3) and each of the corresponding emergency passing points (P1, P4, and P5) along the predetermined route. In another embodiment, the flight landing distance is a linear distance between each of the emergency landing coordinates (EL1, EL2, and EL3) and each of the corresponding emergency passing points (P1, P4, and P5). For example, in the embodiment, the flight landing distance is a distance the unmanned aerial vehicle 100 flies from the emergency passing point P1 to the emergency landing coordinate EL1, a distance the unmanned aerial vehicle 100 flies from the emergency passing point P4 to the emergency landing coordinate EL2, or a distance the unmanned aerial vehicle 100 flies from the emergency passing point P5 to the emergency landing coordinate EL3. In the embodiment, flight landing paths of the unmanned aerial vehicle 100 flying from the emergency passing points (P1, P4, and P5) to the emergency landing coordinates (EL1, EL2, and EL3) may be stored in the storage medium 130 in advance to ensure that the paths of the unmanned aerial vehicle 100 flying to the emergency landing coordinates (EL1, EL2, and EL3) are single paths without any obstacle along the landing process.

Referring to FIG. 1 to FIG. 3, when the abnormal flight status of the unmanned aerial vehicle 100 occurs, the processor 110 obtains the current coordinate of the unmanned aerial vehicle 100 from the positioning device 120. Next, the unmanned aerial vehicle 100 calculates the distances between the current coordinate and the emergency landing coordinates (EL1, EL2, and EL3) along the predetermined route.

For example, as shown in FIG. 3, the unmanned aerial vehicle 100 is currently located between the passing point P2 and the passing point P3 on the predetermined route. The processor 110 calculates the distance between the current coordinate of the unmanned aerial vehicle 100 and the emergency landing coordinate EL1 is 1300 meters, and 1300 meters is a distance the unmanned aerial vehicle 100 flies along the predetermined route passing the passing point P2 and the emergency passing point P1 to the emergency landing coordinate EL1. In addition, the processor 110 calculates the distance between the current coordinate of the unmanned aerial vehicle 100 and the emergency landing coordinate EL2 is 800 meters, and 800 meters is a distance the unmanned aerial vehicle 100 flies along the predetermined route passing the passing point P3 and the emergency passing point P4 to the emergency landing coordinate EL2. Furthermore, the processor 110 calculates the distance between the current coordinate of the unmanned aerial vehicle 100 and the emergency landing coordinate EL3 is 1500 meters, and 1500 meters is a distance the unmanned aerial vehicle 100 flies along the predetermined route passing the passing point P3, the passing point P4, and the emergency passing point P5 to the emergency landing coordinate EL3.

Next, in step S230, the processor 110 obtains a target emergency landing coordinate according to the shortest distance among the multiple distances above. The target emergency landing coordinate is the emergency landing coordinate corresponding to the shortest distance. In the embodiment, the processor 110 obtains the multiple distances (e.g. 1300 meters, 800 meters, and 1500 meters) from the current coordinate to the emergency landing coordinates (EL1, EL2, and EL3), and the distance the unmanned aerial vehicle 100 flies to the emergency landing coordinate EL2 along the predetermined route is the shortest distance. As a result, in the embodiment, the processor 110 obtains that the target emergency landing coordinate is the emergency landing coordinate EL2 corresponding to the shortest distance (i.e. 800 meters in the embodiment).

Figure 4:
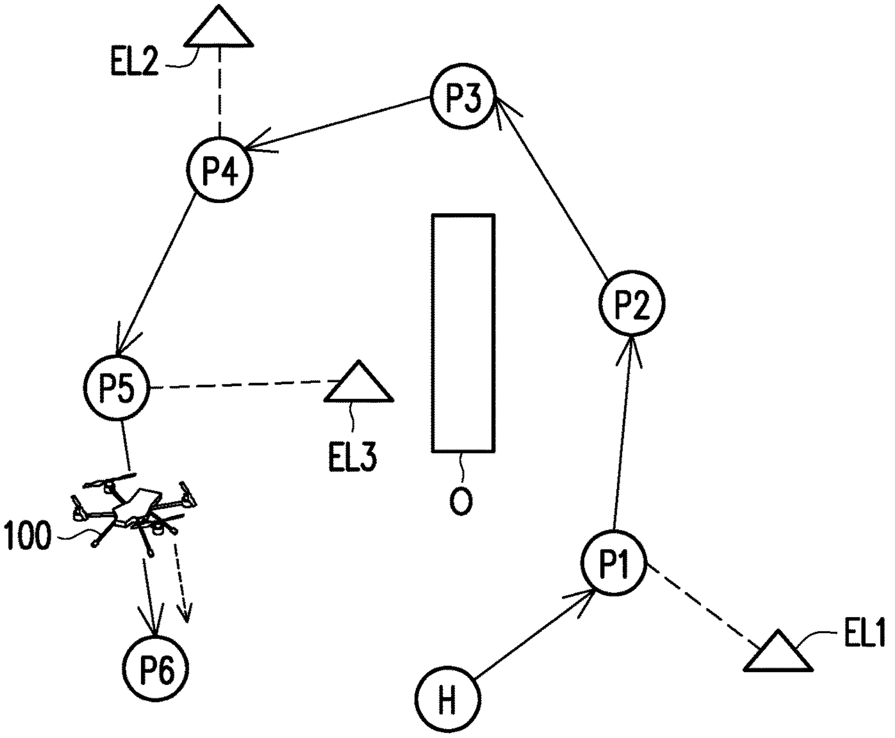
FIG. 4 is a schematic diagram of a predetermined route, emergency landing coordinates, and passing points according to another embodiment of the invention.

In another embodiment, the passing points further include an end point P6 and an origin H of the predetermined route, and the emergency landing coordinates further include an end point coordinate and an origin coordinate of the predetermined route. The end point coordinate is an end point coordinate P6, and the origin coordinate is an origin coordinate H. FIG. 4 is a schematic diagram of a predetermined route, emergency landing coordinates, and passing points according to another embodiment of the invention. In the embodiment, when the processor 110 calculates that the target emergency landing coordinate is the end point coordinate, the corresponding emergency passing point and the target emergency landing coordinate are the end point P6. Furthermore, when the processor 110 calculates that the target emergency landing coordinate is the origin coordinate, the corresponding emergency passing point and the target emergency landing coordinate are the origin H. Referring to Table 2 below, Table 2 is the look-up table including the emergency landing coordinates (H, EL1, EL2, EL3, and P6) and the emergency passing points (H, P1, P4, P5, P6) corresponding to the emergency landing coordinates. Table 2 is shown as below:

TABLE 2

| Emergency landing coordinate | Emergency passing point |
|---|---|
| H | H |
| EL1 | P1 |
| EL2 | P4 |
| EL3 | P5 |
| P6 | P6 |

Referring to FIG. 4, for example, the unmanned aerial vehicle 100 is currently located between the passing point P5 and the end point P6 on the predetermined route. Compared with the distances for the unmanned aerial vehicle 100 flies from the current coordinate to the emergency landing coordinates EL1, EL2, EL3, and the origin H along the predetermined route, the distance the unmanned aerial vehicle 100 flies from the current coordinate to the end point P6 along the predetermined route is the shortest distance. Hence, the processor 110 calculates that in the embodiment, the target emergency landing coordinate is the end point coordinate P6.

Next, in step S240, the processor 110 controls the unmanned aerial vehicle 100 to move to the target emergency landing coordinate along the predetermined route. As shown in FIG. 3, the landing method for the unmanned aerial vehicle 100 of the invention may improve and prevent the situation in which after the conventional unmanned aerial vehicle system determines that an emergency landing point is the emergency landing coordinate EL3 according to the shortest linear distance, the unmanned aerial vehicle 100 collides with an obstacle O during a flight to the emergency landing coordinate EL3, resulting in damage to the unmanned aerial vehicle 100.

In summary of the above, the unmanned aerial vehicle and the landing method for the unmanned aerial vehicle of the invention may allow the unmanned aerial vehicle to safely fly to the emergency landing coordinate, the origin, or the end point according to the predetermined route. In the invention, the distance calculated by the processor is a path distance along the predetermined route to ensure that the unmanned aerial vehicle flies without colliding with the obstacle or flying into a no-flight zone. Hence, in a general flight status or in an emergency flying status, the unmanned aerial vehicle safely flies according to the predetermined route to ensure the safety and stability of the unmanned aerial vehicle during the flight and the landing process.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A landing method for an unmanned aerial vehicle, the method comprising:

detecting a flight status of the unmanned aerial vehicle and obtaining a current coordinate of the unmanned aerial vehicle from a positioning device;

calculating a plurality of distances for the unmanned aerial vehicle from the current coordinate to a plurality of emergency landing coordinates along a predetermined route according to the current coordinate, the predetermined route, and the plurality of emergency landing coordinates, wherein a plurality of passing points are marked on the predetermined route, and the plurality of passing points comprise a plurality of predetermined emergency passing points, wherein each of the plurality of predetermined emergency passing points corresponds to one of the plurality of emergency landing coordinates, and each of the plurality of distances is a sum of a flying distance of the unmanned aerial vehicle from the current coordinate to a corresponding emergency passing point along the predetermined route and a flight landing distance, wherein the flight landing distance is a distance between each of the plurality of emergency landing coordinates and the corresponding emergency passing point, each of the plurality of emergency landing coordinates is reachable from the predetermined route only via corresponding one of the plurality of predetermined emergency passing point along a corresponding single path;

obtaining a target emergency landing coordinate according to a shortest distance among the plurality of distances, wherein the target emergency landing coordinate is one of the plurality of emergency landing coordinates corresponding to the shortest distance; and controlling the unmanned aerial vehicle to move to the target emergency landing coordinate along the predetermined route by passing through corresponding one of the plurality of predetermined emergency passing points corresponding to the target emergency landing coordinate, and the predetermined route includes multiple coordinate positions of the plurality of passing points and a passing order of the plurality of passing points.

2. The landing method for the unmanned aerial vehicle according to claim 1, wherein the plurality of passing points comprise an end point and an origin of the predetermined route.

3. The landing method for the unmanned aerial vehicle according to claim 2, wherein the plurality of emergency landing coordinates further comprise an end point coordinate and an origin coordinate of the predetermined route, when the target emergency landing coordinate is the end point coordinate, the corresponding emergency passing point is the end point, and when the target emergency landing coordinate is the origin coordinate, the corresponding emergency passing point is the origin.

4. An unmanned aerial vehicle, comprising:

a positioning device configured to generate a current coordinate of the unmanned aerial vehicle; and a processor coupled to the positioning device, wherein when the processor detects a flight status of the unmanned aerial vehicle, the processor obtains the current coordinate from the positioning device;

the processor is configured to calculate a plurality of distances for the unmanned aerial vehicle from the current coordinate to a plurality of emergency landing coordinates along a predetermined route according to the current coordinate, the predetermined route, and the plurality of emergency landing coordinates, wherein a plurality of passing points are marked on the predetermined route, and the plurality of passing points comprise a plurality of predetermined emergency passing points, wherein each of the plurality of predetermined emergency passing points corresponds to one of the plurality of emergency landing coordinates, wherein each of the plurality of distances is a sum of a flying distance of the unmanned aerial vehicle from the current coordinate to a corresponding emergency passing point along the predetermined route and a flight landing distance, wherein the flight landing distance is a distance between each of the plurality of emergency landing coordinates and the corresponding emergency passing point, each of the plurality of emergency landing coordinates is reachable from the predetermined route only via corresponding one of the plurality of predetermined emergency passing point along a corresponding single path;

the processor is configured to obtain a target emergency landing coordinate according to a shortest distance among the plurality of distances, wherein the target emergency landing coordinate is one of the plurality of emergency landing coordinates corresponding to the shortest distance; and the processor is configured to control the unmanned aerial vehicle to move to the target emergency landing coordinate along the predetermined route by passing through corresponding one of the plurality of predetermined emergency passing points corresponding to the target emergency landing coordinate, and the predetermined route includes multiple coordinate positions of the plurality of passing points and a passing order of the plurality of passing points.

5. The unmanned aerial vehicle according to claim 4, wherein the plurality of passing points comprise an end point and an origin of the predetermined route.

6. The unmanned aerial vehicle according to claim 5, wherein the plurality of emergency landing coordinates further comprise an end point coordinate and an origin coordinate of the predetermined route, when the target emergency landing coordinate is the end point coordinate, the corresponding emergency passing point is the end point, and when the target emergency landing coordinate is the origin coordinate, the corresponding emergency passing point is the origin.

7. The unmanned aerial vehicle according to claim 4, further comprising a storage medium connected to the processor, wherein the storage medium is configured to store a look-up table and the predetermined route, wherein the look-up table comprises the plurality of emergency landing coordinates and the plurality of predetermined emergency passing points respectively corresponding to the plurality of emergency landing coordinates.

* * * * *